United States Patent [19]
Moore

[11] 3,828,991
[45] Aug. 13, 1974

[54] CARRIER FOR INTERCHANGEABLE CAMERA LENSES

[76] Inventor: MacDonald S. Moore, 77 Fulton St., New York, N.Y. 10038

[22] Filed: Feb. 9, 1973

[21] Appl. No.: 330,927

[52] U.S. Cl. ............... 224/5 V, 220/97 B, 224/5 R, 350/252
[51] Int. Cl. ............................................. A45f 5/00
[58] Field of Search........... 224/5 V, 5 A, 5 R, 5 W, 224/5 G, 45 R, 45 G, 13, 17, 25 R, 26 R, 26 B, 26 K, 28 R, 28 B; 220/97 B; 350/255, 256, 252, 257, 38

[56] References Cited
UNITED STATES PATENTS

| | | | |
|---|---|---|---|
| 2,326,414 | 8/1943 | Thompson | 220/97 B UX |
| 2,401,367 | 6/1946 | Nagel | 350/257 UX |
| 3,048,079 | 8/1962 | Dine et al. | 350/352 |

Primary Examiner—Robert G. Sheridan
Assistant Examiner—Jerold M. Forsberg
Attorney, Agent, or Firm—Blum, Moscovitz, Friedman & Kaplan

[57] ABSTRACT

The carrier is for use with lenses, for still cameras, of the type having mounting ends releasably securable in a lens mount on the camera. The carrier is an annular member formed with a pair of coaxial and axially spaced threaded recesses extending in opposite directions from a central diametric plane, and respective lens mounts are threadedly engaged in each recess for securement of a respective interchangeable camera lens therein. The lens mount may be threaded for threaded engagement with a lens or may have a bayonet-type joint for engagement with a corresponding bayonet-type joint on the lens. The annular member has an imperforate diaphragm or partition extending thereacross at its central plane providing dust-proof mounting for the lens mounts. A pair of apertured lugs are threaded into the annular member at diametrically opposite points to receive snap hooks on the ends of a neck strap for supporting the carrier.

7 Claims, 5 Drawing Figures

PATENTED AUG 13 1974 3,828,991
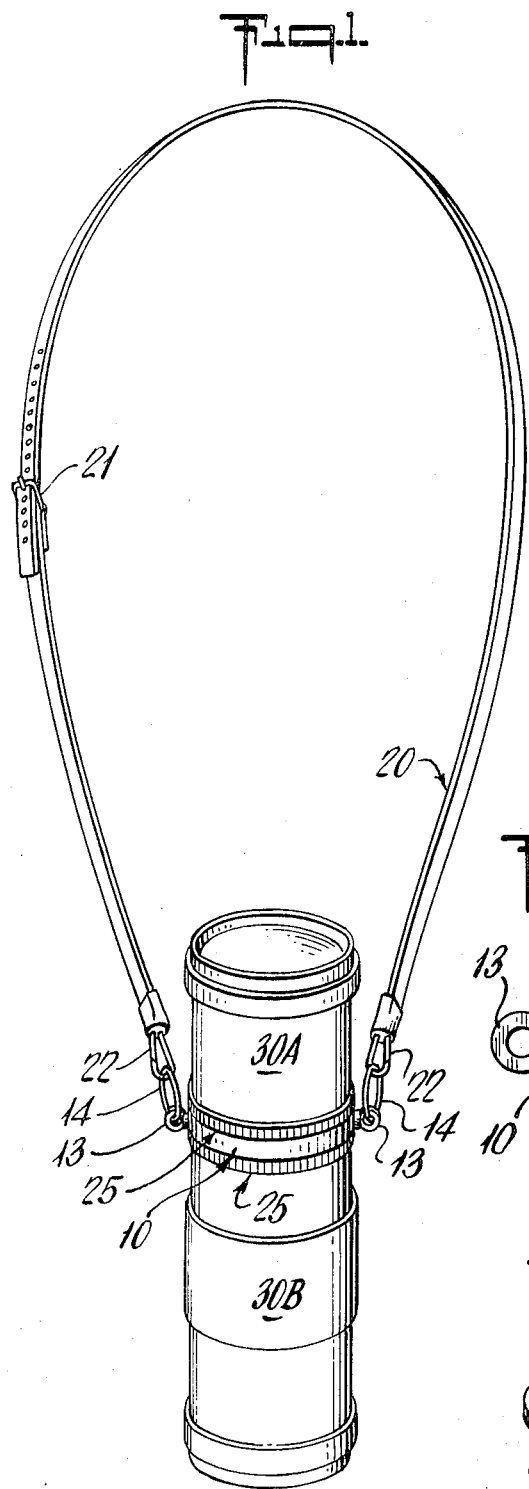
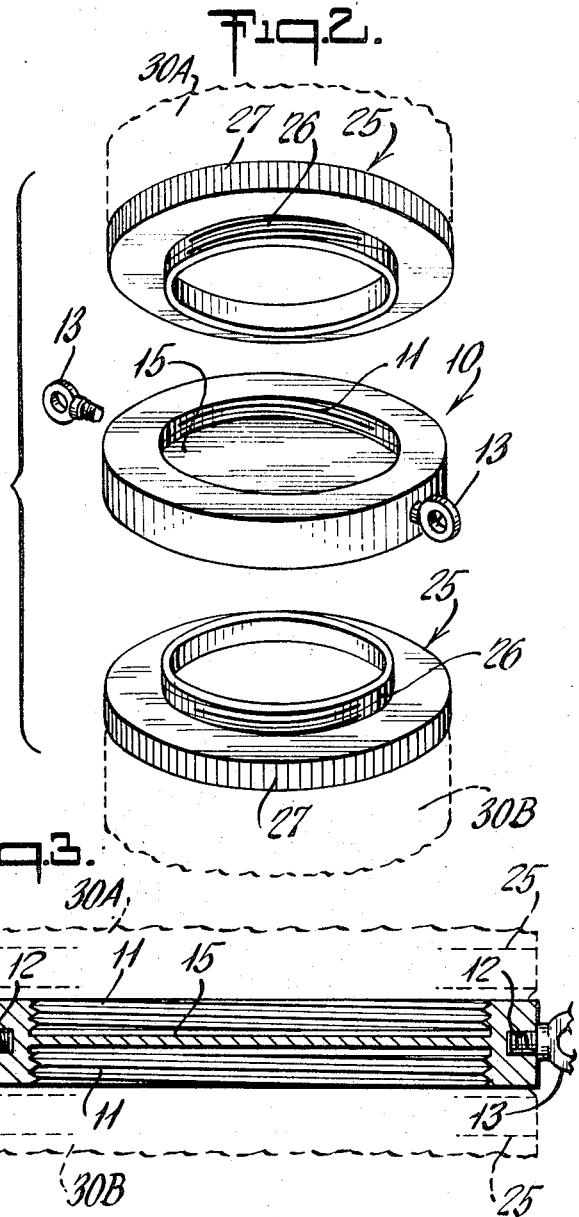
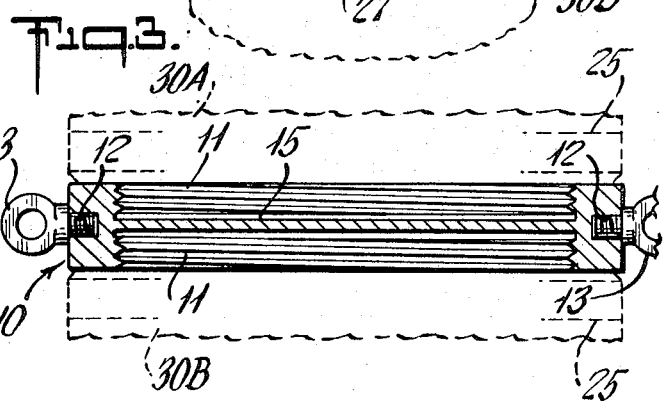
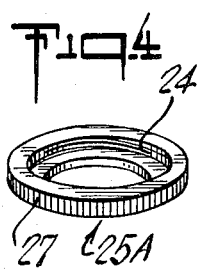
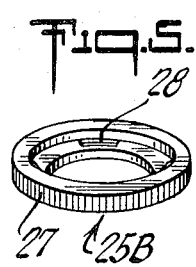

CARRIER FOR INTERCHANGEABLE CAMERA LENSES

FIELD AND BACKGROUND OF THE INVENTION

This invention relates to photographic equipment and, more particularly, to a novel and improved carrier for suspended support of interchangeable lenses for still cameras.

Many still cameras are arranged to have different lenses interchangeably secured thereto by engagement in lens mounts on the cameras. The engagement may be a threaded engagement or may be a bayonet-type joint engagement. The extra lenses for use with a still camera must be carried by the photographer, generally in a case or the like, along with a substantial amount of other photographic equipment such as film, exposure meters, flash equipment, light filters and the like.

Because of the amount of equipment that must be carried by the average photographer using a still camera, and particularly a professional photographer, there is a need for a simple inexpensive means for readily carrying interchangeable lenses in a dust-proof manner. The usual gadget bags for carrying photographic accessories are of a large and bulky nature, and are not particularly efficient in providing the photographer with ready access to interchangeable lenses and the like stored in such gadget bags.

SUMMARY OF THE INVENTION

In accordance with the present invention, a simple, improved and dust-proof carrier for interchangeable lenses for still cameras is provided in the form of an annular member or ring having a pair of coaxial and axially spaced threaded recesses extending in opposite directions from a simple diametric plane and separated by an imperforate diaphragm or partition. These recesses are threaded to receive the male threads of a pair of lens mounts, which thus may be screwed into the annular member. The lens mounts may have female threads for receiving the male threads on an interchangeable lens, or may have bayonet-type latching arrangements for cooperation with corresponding bayonet joints on an interchangeable lens.

A pair of apertured lugs are threaded into the annular member at diametrically opposite points, so that a neck strap may be disengageably secured to these lugs for suspending the lens carrier around the neck of the photographer, for example. For example, the neck strap may be adjustable in length and may have snap fasteners at its ends engageable in the apertured lugs.

An object of the invention is to provide an improved carrier for interchangeable lenses for still cameras.

Another object of the invention is to provide such a carrier which may be readily suspended about the neck of a photographer.

A further object of the invention is to provide such a carrier in the form of an annular member arranged to have a pair of lens mounts threaded into opposite ends thereof for receiving a pair of interchangeable lenses.

Still other objects and advantages of the invention will in part be obvious and will in part be apparent from the specification.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawing, in which:

FIG. 1 is a perspective view of a carrier embodying the invention and having a pair of interchangeable still camera lenses secured therein;

FIG. 2 is an exploded perspective view illustrating the carrier and the associated lens mounts;

FIG. 3 is a diametrical sectional view through the carrier;

FIG. 4 is a perspective view of a lens mount having a female thread for engagement with male threads on an interchangeable lens; and FIG. 5 is a perspective view of a lens mount having a bayonet joint for cooperation with a bayonet joint on the end of an interchangeable lens.

DESCRIPTION OF THE PREFERRED EMBODIMENT

Referring to FIG. 1, a lens support embodying the invention is illustrated as comprising an annular carrier 10 having a pair of lens mounts 25 threaded thereinto and each supporting a respective lens 30A or 30B. A neck strap 20 is secured to lugs on carrier 10 for suspended support of the carrier and the lenses, strap 20 constituting a suspension means for the carrier.

Referring to FIGS. 2 and 3, carrier 10 is an annular member having a pair of threaded recesses 11 which are coaxial and axially spaced, and extend in opposite directions from a central diametric plane of annular member 10. At this diametric plane, annular member 10 is formed with an imperforate partition or diaphragm 15 separating recesses 11 from each other. Carrier member 10 is also formed with a pair of diametrically opposite threaded recesses 12 each arranged to have a lug 13 screwed thereinto, the lugs 13 being provided with the rings 14 for cooperation with the snaps 22 on the opposite ends of the neck strap 20 which has a buckle 21 for adjustment of its length.

Each of the threaded recesses 11 is arranged to have threaded thereinto the male threaded end 26 of a respective lens mount 25, each lens mount having a knurled ring 27. As stated, the lens mounts are arranged to have interchangeably engaged therein interchangeable lenses for a still camera, such as the interchangeable lenses 30A and 30B.

In some cameras, the interchangeable lenses have threaded male ends for engagement in a lens mount and, for this purpose, the lens mount, such as the mount 25A of FIG. 4, is provided with a female thread 24 for threading thereinto of the male thread on a lens mount. In other cameras, the interchangeable lenses are interchangeably secured in lens mounts by virtue of a bayonet joint. For this purpose, a lens mount, such as the lens mount 25B, shown in FIG. 5, is provided with a bayonet-type slot or joint 28.

It will thus be seen that a very simple suspension mount for interchangeable lenses, for still cameras, is provided by the annular member 10 having the partition 15 which, when a lens mount 25 is threaded into a recess 11, forms a dustproof seal for the lens mount. When the device is suspended around the neck of a photographer by means of the strap 20, it is very easy for the photographer to remove or insert an interchangeable lens 30A or 30B into a lens mount 25, which either may be a lens mount of the type shown at 25A in FIG. 4 or a lens mount of the type shown at 25B in FIG. 5. The device is simple, inexpensive, and efficient in operation.

It will thus be seen that the object set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

What is claimed is:

1. A carrier for interchangeable lenses, for still cameras, of the type having mounting ends releasably securable in a lens mount on a camera, comprising, in combination, an annular member formed with a pair of coaxial axially spaced threaded recesses extending in opposite directions from a central diametric plane of said member; a respective lens mount threadedly engaged in each recess for securement of a respective interchangeable lens therein; a neck strap; and means securing the ends of said neck strap to said annular member for suspended support of said annular member.

2. A carrier for interchangeable lenses, as claimed in claim 1, in which said annular member is formed with an imperforate partition extending diametrically thereacross between said threaded recesses.

3. A carrier for interchangeable lenses, as claimed in claim 1, in which said carrier is formed with a pair of diametrically opposite threaded recesses; and respective threaded apertured lugs threaded into said recesses; said neck strap having ends engageable with said lugs.

4. A carrier for interchangeable lenses, as claimed in claim 3, in which said neck strap is adjustable in length and has snaps at its opposite ends for cooperation with said lugs.

5. A carrier for interchangeable lenses, as claimed in claim 1, in which at least one of said lens mounts has a threaded recess for engagement with a threaded mounting end on an interchangeable lens.

6. A carrier for interchangeable lenses, as claimed in claim 1, in which at least one of said lens mounts has a recess formed with a bayonet slot for engagement with a bayonet lug on the mounting end of an interchangeable lens.

7. A carrier for interchangeable lenses, as claimed in claim 1, in which the external diameter of said annular member is substantially equal to the external diameter of said lens mounts.

* * * * *